US007949603B1

(12) United States Patent
Cao et al.

(10) Patent No.: US 7,949,603 B1
(45) Date of Patent: May 24, 2011

(54) SECURE ONLINE TRANSACTION SYSTEM AND METHOD

(75) Inventors: Guangqi Cao, Nanjing (CN); Xiang Yuan, Nanjing (CN); Yi Zhou, Nanjing (CN)

(73) Assignee: Trend Micro Incorporated, Tokyo (JP)

( * ) Notice: Subject to any disclaimer, the term of this patent is extended or adjusted under 35 U.S.C. 154(b) by 716 days.

(21) Appl. No.: 11/439,054

(22) Filed: May 23, 2006

(51) Int. Cl.
*G06Q 40/00* (2006.01)
(52) U.S. Cl. ............................................. 705/45; 705/35
(58) Field of Classification Search .................... 705/45, 705/35
See application file for complete search history.

(56) References Cited

U.S. PATENT DOCUMENTS
6,535,855 B1 * 3/2003 Cahill et al. ...................... 705/1

OTHER PUBLICATIONS
Ari Juels, et al., "Active Cookies for Browser Authentication", Feb. 2, 2006, RSA Laoratories and RavenWhite Inc., U.S.
Dynapass Dynamic Passwords—Features, Distributor of High-End LAN Oriented Products. [online], [retrieved on May 12, 2006]. Retrieved from the Internet:<URL:http://www.cms.be/dynapass_features.htm>.
Man-in-the-middle attacks, [online], [retrieved on May 12, 2006]. Retrieved from the Internet:<URL:http://www.asianlaws.org/infosec/library/general/mim.htm>.

* cited by examiner

*Primary Examiner* — Thu Thao Havan
(74) *Attorney, Agent, or Firm* — Okamoto & Benedicto LLP

(57) ABSTRACT

In one embodiment, an online financial account has an associated telephone registered to the account. The financial account may be accessed over a computer network, such as the Internet. Upon receipt of a request to access the account, a text message containing a dynamic password is forwarded to the telephone over a telephone network. The user trying to access the account may use the telephone to reply to the text message with another text message that includes the dynamic password. The request to access the account may be granted if the reply includes a portion that corresponds to the dynamic password.

14 Claims, 6 Drawing Sheets

SECURE ONLINE TRANSACTION SYSTEM AND METHOD

BACKGROUND OF THE INVENTION

1. Field of the Invention

The present invention relates generally to data processing, and more particularly but not exclusively to online transactions over a computer network.

2. Description of the Background Art

Various financial transactions may be performed over the Internet. Examples of these financial transactions include online banking, sending or receiving of payments for product purchases (e.g., use of PayPal™ system), credit card purchases, and so on. Unfortunately, the convenience of performing online financial transactions over the Internet not only attracts legitimate users but fraudsters as well. Fraudsters gain access to online financial accounts of their victims using a variety of techniques including by "phishing," use of a Trojan horse, and man-in-the-middle attacks. Phishing involves some form of misrepresentation. In a typical phishing attack, the victim receives an email falsely claiming to be from the victim's financial institution. The email is made to look convincingly real, oftentimes complete with the look and feel of emails from the financial institution. The email includes a link to the fraudster's website, where the victim enters his financial account information (e.g., login ID and password) thinking he is providing the information to his financial institution.

A Trojan horse is an apparently useful program or data that contains malicious code. The malicious code allows the fraudster to keep track of keystrokes entered on a computer with the Trojan horse, access the computer, and perform other unauthorized actions on the computer. The Trojan horse thus allows the fraudster to get financial account information available in the computer.

Man-in-the-middle ("MITM") attacks involve an intermediate computer intercepting communications between two other computers, such as a user's client computer and a financial institution's server computer. The intermediate computer monitors, and sometimes even modifies, intercepted communications, which may include financial account information.

Various IP and URL reputation services have been developed to prevent some of these attacks. Generally speaking, IP and URL reputation services combat phishing by checking the source IP address of an email or the URL of a website against a list of known phishing sites. However, reputation-based security measures only work against known phishing scams, are not easy to implement, and have difficulty preventing man-in-the-middle attacks and key-logging.

Once the fraudster gets a hold of legitimate financial account information, it is relatively easy for the fraudster to take advantage of the anonymity of the Internet to access the victim's financial account online and perform an unauthorized transaction, such as transferring funds out of the victim's account. What is needed is a way to enhance security of online transactions without unduly impacting the ease and convenience by which these transactions may be performed.

SUMMARY

In one embodiment, an online financial account has an associated telephone registered to the account. The financial account may be accessed over a computer network, such as the Internet. Upon receipt of a request to access the account, a text message containing a dynamic password is forwarded to the telephone over a telephone network. The user trying to access the account may use the telephone to reply to the text message with another text message that includes the dynamic password. The request to access the account may be granted if the reply includes a portion that corresponds to the dynamic password.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
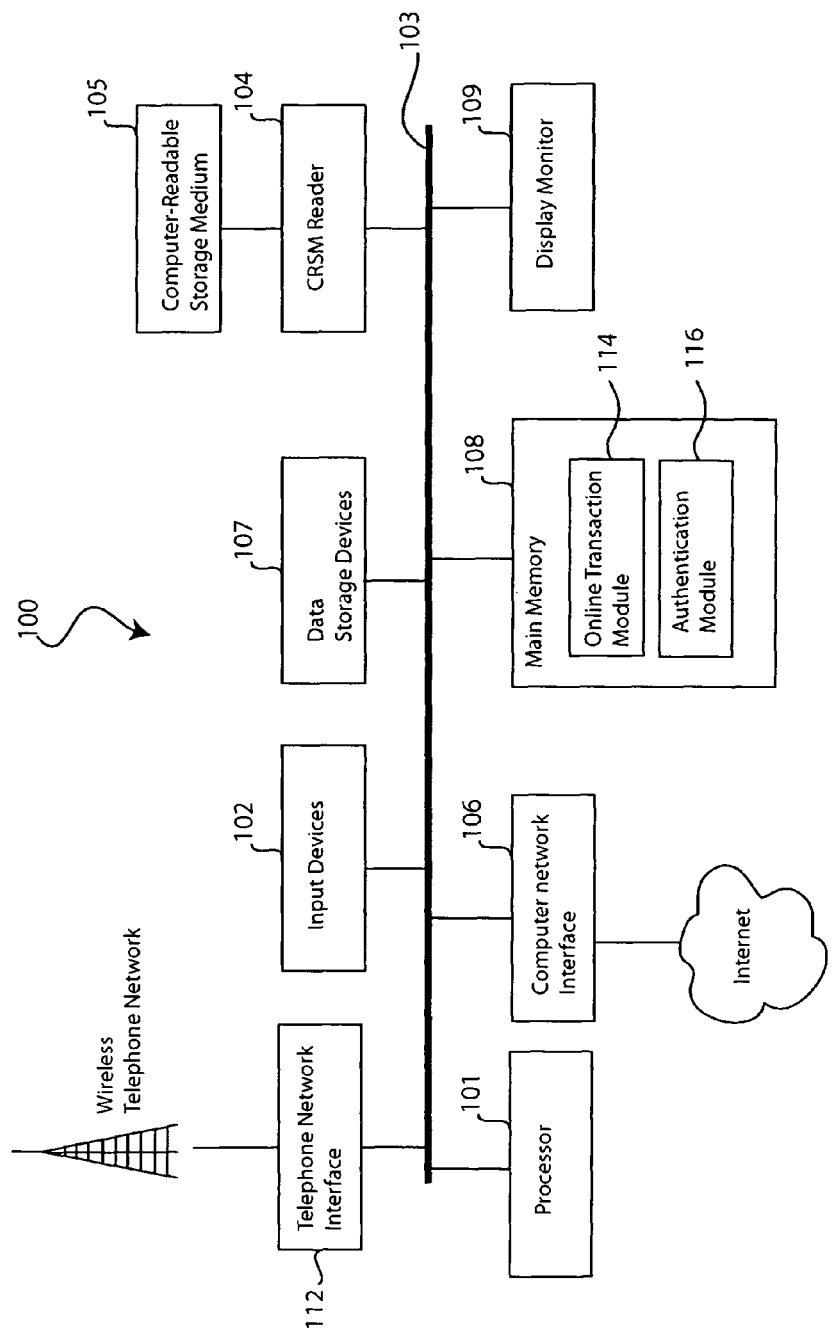
FIG. 1 shows a schematic diagram of an online transaction computer in accordance with an embodiment of the present invention.

FIG. 1 shows a schematic diagram of an online transaction computer 100 in accordance with an embodiment of the present invention. The computer 100 may have less or more components to meet the needs of a particular application. As shown in FIG. 1, the computer 100 may include a processor 101, such as those from the Intel Corporation or Advanced Micro Devices, for example. The computer 100 may have one or more buses 103 coupling its various components. The computer 100 may include one or more input devices 102 (e.g., keyboard, mouse), a computer-readable storage medium (CRSM) 105 (e.g., floppy disk, CD-ROM), a CRSM reader 104 (e.g., floppy drive, CD-ROM drive), a display monitor 109 (e.g., LCD, cathode ray tube, flat panel display), a computer network interface 106 (e.g., network adapter, modem) for communicating over computer networks, one or more data storage devices 107 (e.g., hard disk drive), a main memory 108 (e.g., RAM), and a telephone network interface 112 for communicating over a telephone network (e.g., wireless telephone network). Software embodiments may be stored in a computer-readable storage medium 105 for reading into a data storage device 107 or main memory 108. Software embodiments may also be received over a computer network by way of the computer network interface 106. In the example of FIG. 1, main memory 108 includes a later-described online transaction module 114 and an authentication module 116, both of which may be executed by the processor 101. The computer 100 is shown in FIG. 1 as a single computer for clarity of illustration. As can be appreciated, the functionality of the computer 100 may also be distributed to two or more computers.

Figure 2:
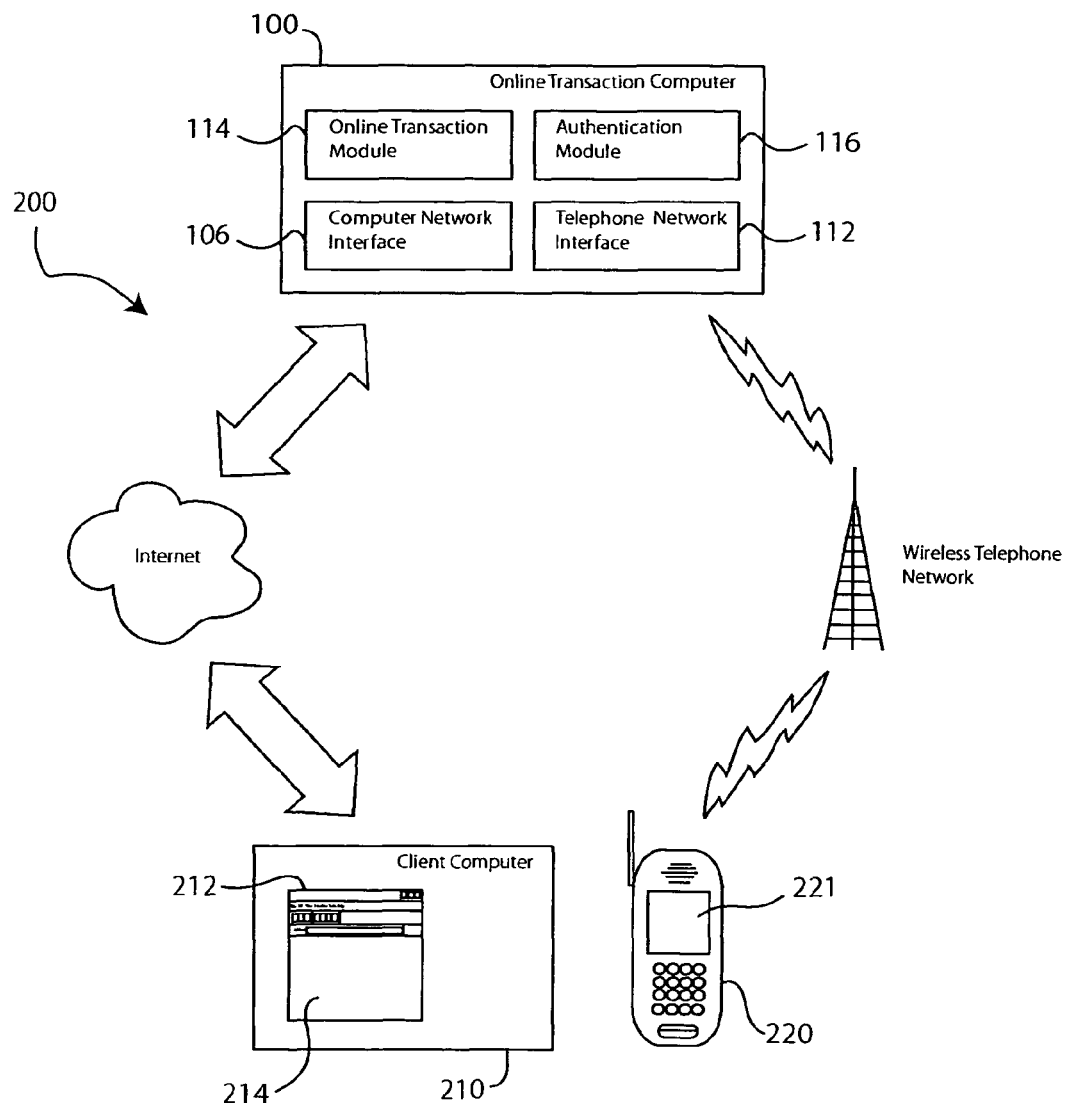
FIG. 2 schematically shows an online transaction environment in accordance with an embodiment of the present invention.

FIG. 2 schematically shows an online transaction environment 200 in accordance with an embodiment of the present invention. The environment 200 includes the online transaction computer 100, a client computer 210, and a mobile phone 220. In the example of FIG. 2, the client computer 210 communicates with the computer 100 over the Internet, while the mobile phone 220 communicates with the computer 100 over a wireless telephone network. As will be more apparent below, each account accessible by way of the transaction computer 200 may have an associated registered telephone. Accordingly, the environment 200 may involve more than one mobile phone 220 and more than one client computer 210. Only a single mobile phone 220 and a single client computer 210 are shown in FIG. 2 for clarity of illustration. The computer 220 and the client computer 210 are example apparatus a user may employ to access his online financial account by way of the transaction computer 100.

The online transaction computer 100 may comprise a server computer operated by a financial institution, such a bank that provides online banking services to pay for purchases, send and receive money, pay bills, and so on. A user having an account with the bank may employ the client computer 210 to access his account. Typically, accessing the account requires the user to provide account information, such as a login ID and a password. In the example of FIG. 2, the user may access his account online by initiating communications with the transaction computer 100 over the Internet. The client computer 210 may include a commercially-available web browser 212 (e.g., Microsoft Internet Explorer™ web browser) for viewing web pages 214 of the transaction computer 100.

The online transaction computer 100 may comprise the computer network interface 106, the telephone network interface 112, the online transaction module 114, and the authentication module 116. The computer network interface 106 may comprise a network interface card (e.g., Ethernet card) and associated software driver configured to allow the transaction computer 100 to communicate over a computer network. In the example of FIG. 2, the computer network interface 106 allows the transaction computer 100 to send and receive data to and from the client computer 210 over the Internet.

The telephone network interface 112 may comprise an interface card and associated software driver configured to allow the computer 100 to communicate with telephones coupled to the Public Switched Telephone Network (PSTN) or similar circuit-switched telephone networks. The telephone network interface 112 may be configured to couple the transaction computer 100 to a wireless telephone network servicing the mobile phone 220.

The online transaction module 114 may comprise computer-readable program code for allowing a user to access and manage a financial account with the financial institution operating the transaction computer 100. For example, the online transaction module 114 may comprise banking software. Other conventional online transaction software may also be used without detracting from the merits of the present invention. Embodiments of the invention may be adapted for use by existing conventional online transaction software including those employed by banks, credit card companies, online payment services, and the like. The online transaction module 114 may include web pages that may be received by client computers 210 of users wishing to access their accounts over the Internet.

The authentication module 116 may comprise computer-readable program code for preventing unauthorized access to financial accounts accessible by way of the transaction computer 100. In one embodiment, the authentication module 116 is configured to generate a dynamic password, send the dynamic password to the mobile phone 220, receive a reply from the mobile phone 220 (or another telephone), and determine whether the reply corresponds to the dynamic password. The authentication module 116 may be configured to send and receive text messages, such as Short Message Service (SMS) message, to and from the mobile phone 220. In one embodiment, the authentication module 116 sends a dynamic password to and receives a reply from the mobile phone 220 by SMS.

A dynamic password is provided to the user on as needed basis. In one embodiment, the authentication module 116 generates a "one-time" dynamic password in response to a request to access an online account. In that embodiment, the resulting one-time dynamic password is not provided to the user until after the request is received and is valid only for that particular transaction (i.e., the one-time dynamic password will not work for another transaction even with the same account). Use of one-time dynamic passwords helps improve security as it can only be used for one particular transaction. However, use of dynamic passwords, without more, still has a security issue in that it does not provide protection against man-in-the-middle attacks. That is, an intervening computer that is part of a man-in-the-middle attack may intercept the dynamic password and use it for the particular transaction for which the dynamic password is valid. As will be more apparent below, embodiments of the present invention addresses this security issue by using separate communication media for working with accounts versus sending and receiving of passwords.

The mobile phone 220 may comprise a conventional mobile phone capable of text messaging, such as sending and receiving of SMS text messages. The mobile phone 220 may have a display screen 221 for reading and composing text messages.

The online transaction module 114 may be configured to service a plurality of financial accounts, with each account having an associated telephone. A user may register a mobile phone 220 for his account. Upon receipt of a request to access an account, the online transaction module 114 may be configured to alert the authentication module 116 to authenticate the access request. In response to the access request, the authentication module 116 generates a dynamic password that has not been previously provided to the user. The authentication module 116 sends the dynamic password to the telephone registered with the account, which is the mobile phone 220 in this example. The authentication module 116 dials the telephone number of the mobile phone 220 to send it a text message containing the dynamic password. Assuming the user (not a fraudster) is making the access request, the user receives the text message from the authentication module 116 and replies to the authentication module 116 with another text message. If the reply from the user corresponds to the dynamic password, the authentication module 116 so informs the online transaction module 114 to allow the user to access the account. Otherwise, access to the account is prevented. FIGS. 3A-3F schematically illustrate the just mentioned example.

In FIGS. 3A, 3B, 3E, and 3F, the web pages 214 (i.e., 214-1, 214-2, etc.) are provided by the online transaction module 114 of the transaction computer 100, which in this example provides online banking services for a fictitious bank named "Online Bank." The web pages 214 allow the online transaction module 114 to send and receive information to and from the user. A user having an account with the Online Bank may access his account over the Internet using his client computer 210 (see FIG. 2). In the example of FIGS. 3A-3F, authentication is performed whenever someone tries to perform an action involving money transfer. Of course, authentication may also be performed for other account accesses including simply logging onto the account.

Figure 3A:
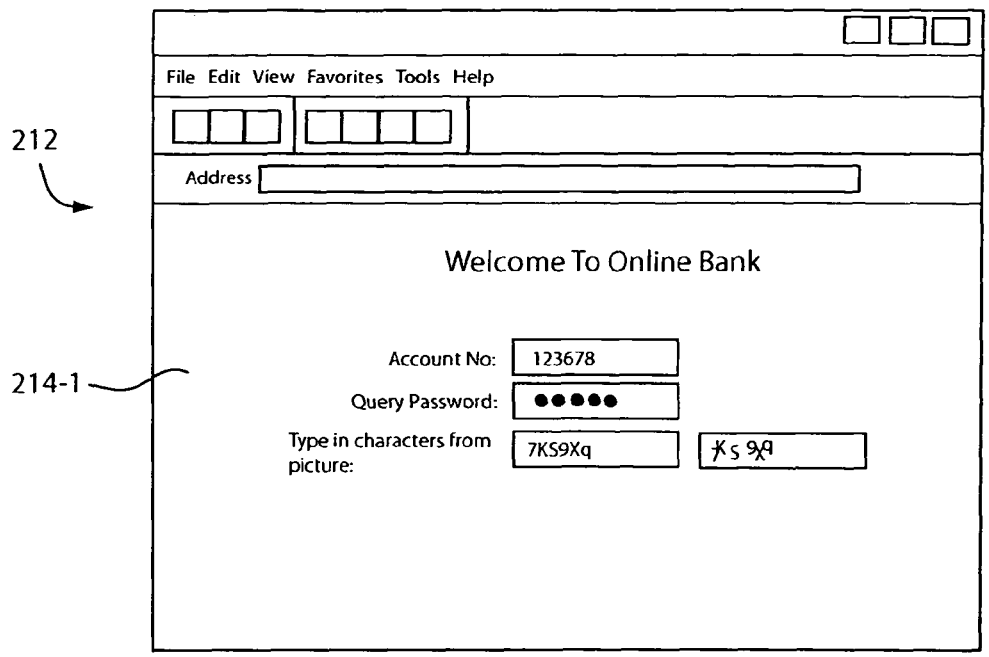
FIGS. 3A, 3B, 3C, 3D, 3E, and 3F schematically illustrate an example transaction in the environment of FIG. 2 in accordance with an embodiment of the present invention.

FIG. 3A shows the web browser 212 displaying a web page 214-1 from the online transaction module 114. The web page 214-1 allows the user to input his account information, which in the example of FIG. 3A comprises his account no. ("Account No.:") and a query password ("Query Password"). The account no. is "123678" in this example. The account no. may serve as a login ID, while the query password serves as a low-level security measure. The web page 214-1 may require entry of characters ("Type in characters from picture") that are graphically shown as a security measure against robots and like malicious codes. Activating (e.g., by clicking) the GO! button results in the information shown in FIG. 3A being provided to the transaction computer 100.

Figure 3B:
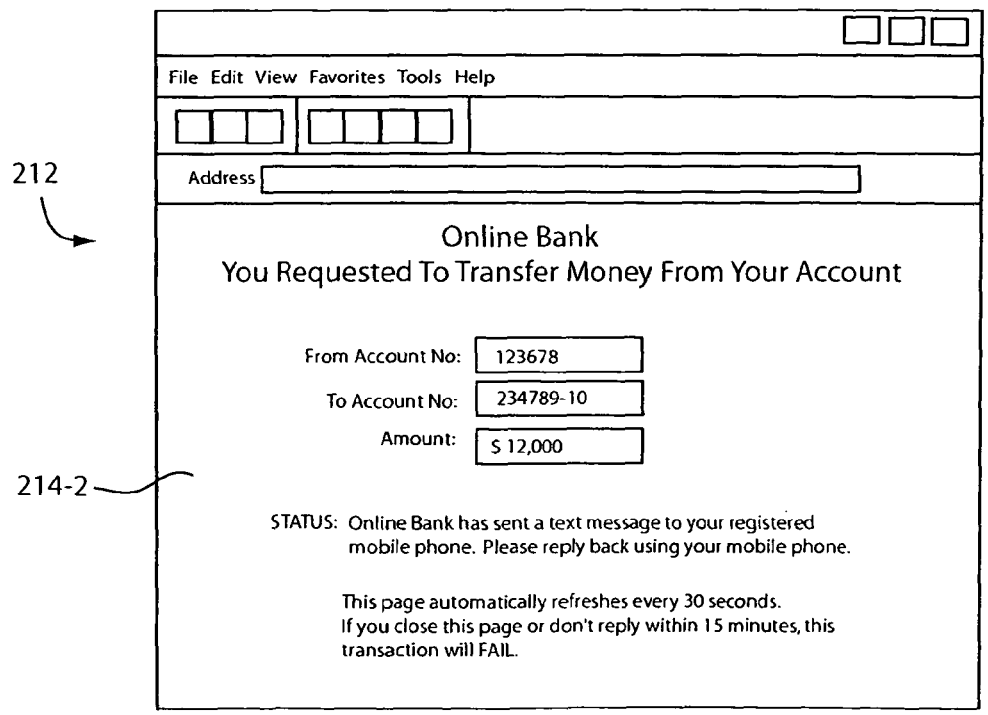

In FIG. 3B, the web browser 212 displays the web page 214-2, which is provided by the online transaction module 114 after the user logs on to account no. "123678" and requests to perform money transfer. In FIG. 3B, the user is trying to transfer $12,000 from account no. "123678" to account no. "234789-10." Account no. "234789-10" may be another Online Bank account or an account with another financial institution. In response to this account access request, the authentication module 116 sends a dynamic password to the mobile phone 220, which is the telephone registered with account no. "123678" in this example. In one embodiment, the dynamic password is sent as an SMS text message 331 (see FIG. 3C) to the mobile phone 220. Web page 214-2 provides status information so that the user can anticipate the text message.

Figure 3C:

In FIG. 3C, the mobile phone 220 receives the text message 331 and displays it in the display screen 221. The text message 331 may include instructions on how to respond to the text message to complete the requested transaction. In the example of FIG. 3C, the text message 331 informs the user to reply back with another text message that includes the noted dynamic password, which is "456dynamicpassword123" in this example.

Figure 3D:
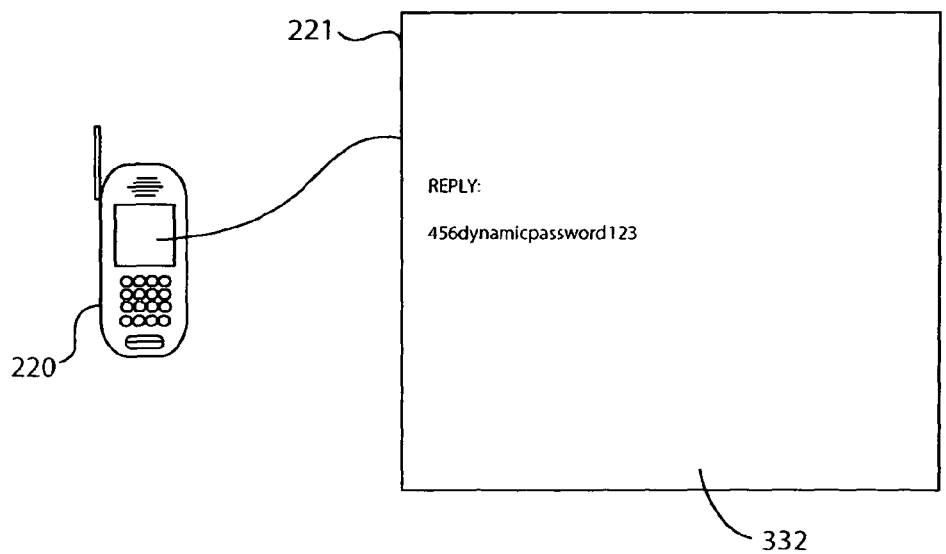

In FIG. 3D, the user replies to the text message 331 with an SMS text message 332. The text message 332, shown as displayed in the display screen 221 of the mobile phone 220, includes the dynamic password noted in the text message 331 received from the transaction computer 100. The user then sends the text message 332 to the sender of the text message 332.

Figure 3E:
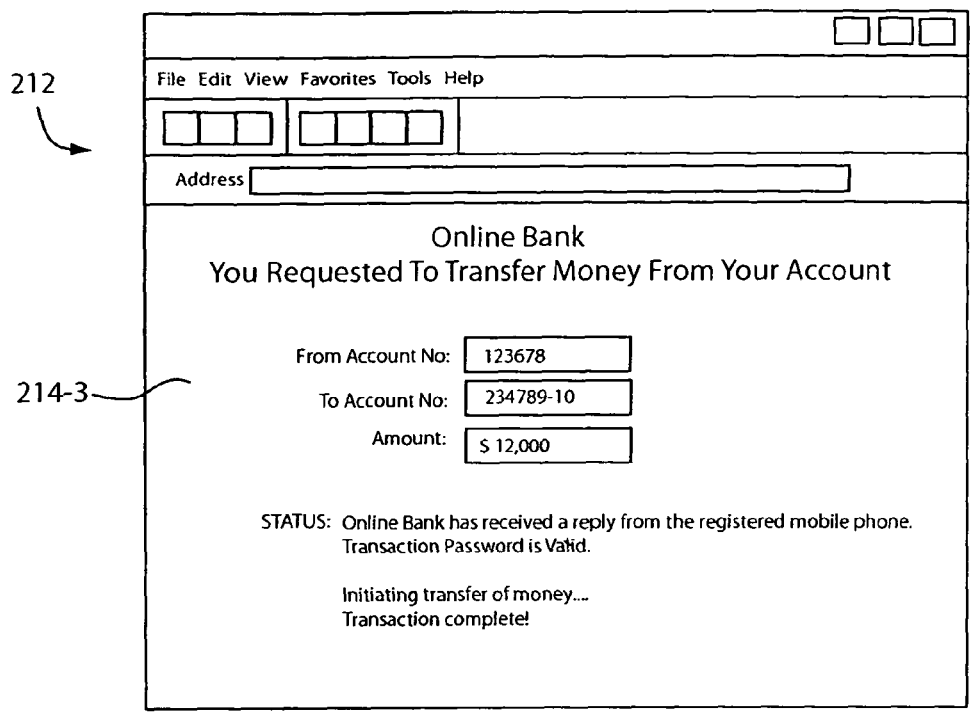

The transaction computer 100 receives the text message 332 from the mobile phone 220. There, the authentication module 116 parses the text message 332 for the dynamic password. If it finds texts corresponding to the dynamic password in the text message 332, the authentication module 116 deems the request to transfer money as a legitimate transaction and accordingly informs the online transaction module 114. In response, as shown in FIG. 3E, the online transaction module 114 provides the web page 214-3 to the user to indicate that the request to transfer money has been authenticated and completed.

Figure 3F:
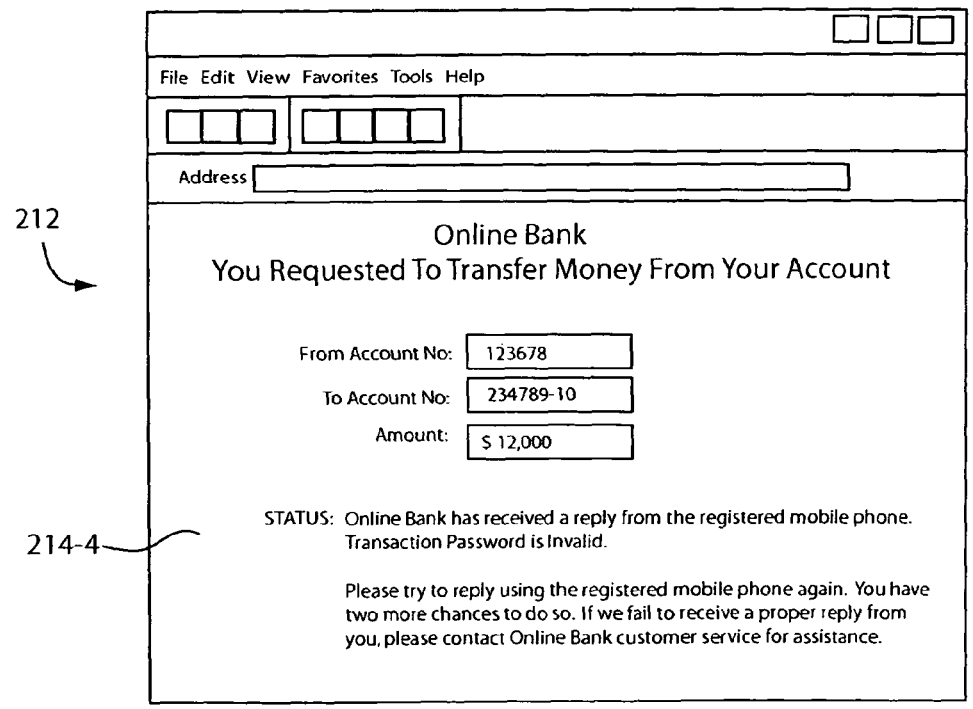

Otherwise, if the text message 332 does not include texts corresponding to the dynamic password or is not received in the transaction computer 100 within a predetermined amount of time, the authentication module 116 so informs the online transaction module 114, which then prevents the requested money transfer from proceeding. In that case, as shown in FIG. 3F, the online transaction module 114 may display the web page 214-4 to inform the user of the situation. Depending on implementation, the online transaction module 114 may allow for a predetermined number of retries before it prevents any further attempts to access the account.

Figure 4:
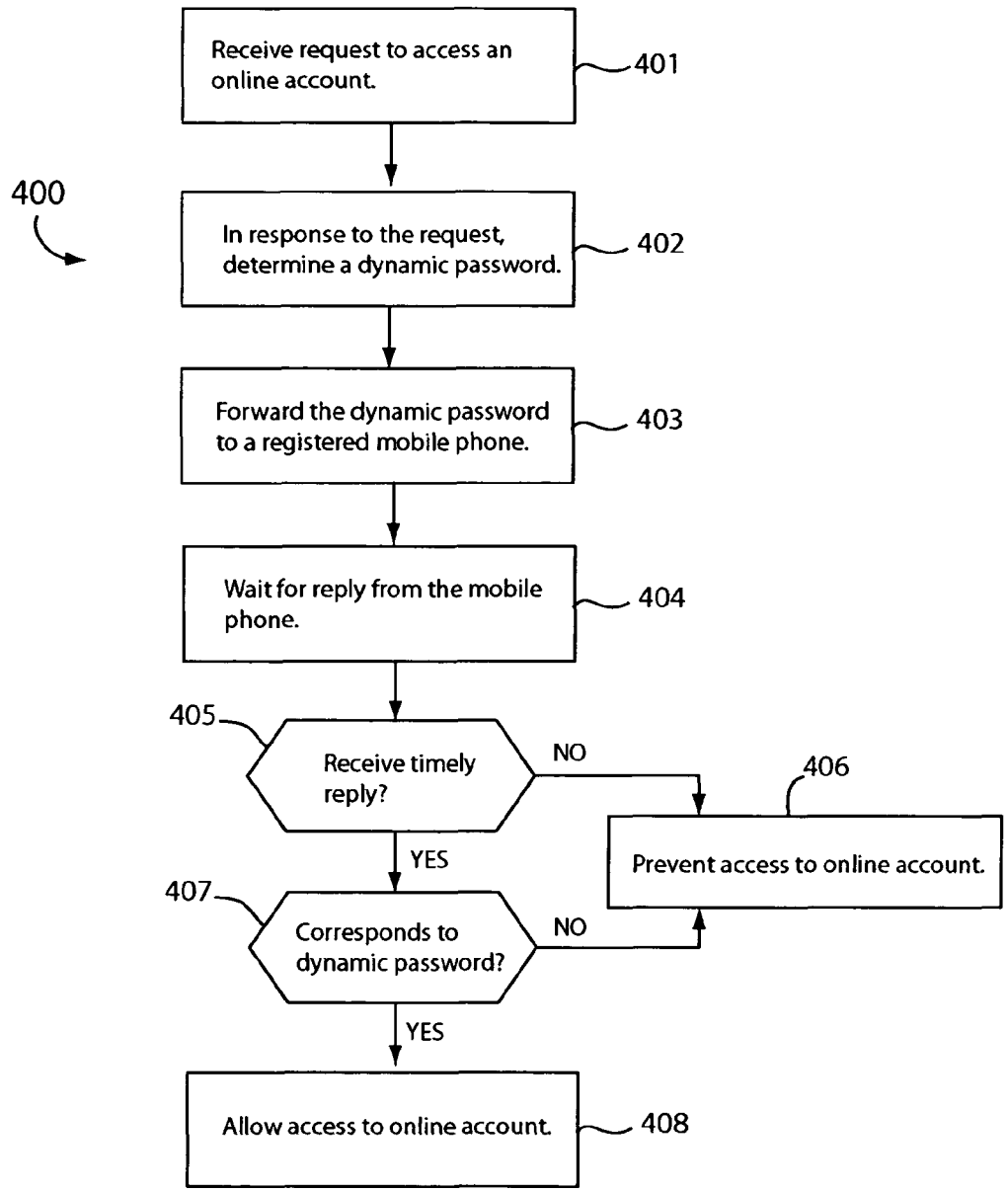
FIG. 4 shows a flow diagram of a method of performing a secure online transaction in accordance with an embodiment of the present invention.

FIG. 4 shows a flow diagram of a method 400 of performing a secure online transaction in accordance with an embodiment of the present invention. The method 400 is described using the components of the environment 200 shown in FIG. 2. It should be understood, however, that the method 400 may also be performed using other components without detracting from the merits of the present invention.

In step 401, the online transaction computer 100 receives from the client computer 210 a request to access an online financial account. The request may be submitted by a user accessing a web page of the online transaction computer 100 over the Internet. The request may be to simply logon to the account or to transfer money into or out of the account. In the online transaction computer 100, the online transaction module 114 processes the request by first alerting the authentication module 116 to authenticate the request as a security measure. In some implementations, it may be advantageous to perform this security measure from the beginning (i.e., even to just logon to the account to check balances etc.) In other implementations, for ease of access to the account, it may be advantageous to perform this security measure only in transactions involving transfer of money.

In step 402, the authentication module 116 determines a dynamic password in response to the request. The dynamic password may be generated randomly, for example. The dynamic password may be selected by the authentication module 116 from a list of passwords stored in the online transaction computer 100 (but not provided to the user) or generated on the fly when a request to access an account is received. In one embodiment, the dynamic password is valid only for the one particular request and is not valid for other transactions even those involving the same account. Also, the dynamic password is provided to the user only after submitting the request.

In step 403, the authentication module 116 forwards the dynamic password to the mobile phone 220 registered with the account. In one embodiment, the authentication module 116 sends the dynamic password as an SMS text message to the mobile phone 220.

In step 404, the authentication module 116 waits for a reply from the mobile phone 220. The reply may be in the form of another SMS text message. The authentication module 116 may wait for the reply for a predetermined amount of time (e.g., 15 minutes).

In steps 405 to 406, if the authentication module 116 does not receive any reply from the mobile phone 220 within the predetermined amount of time, the authentication module 116 so informs the online transaction module 114, which then prevents access to the online financial account.

In steps 405 to 407, if the authentication module 116 receives a timely reply from the mobile phone 220, the authentication module 116 parses the reply to check for texts corresponding to the dynamic password. In one embodiment, the authentication module 116 checks the reply for texts identical to the dynamic password. In other embodiments, the authentication module 116 checks the reply for texts that may be decoded to be the dynamic password. In yet other embodiments, the authentication module 116 checks the reply for texts that include the dynamic password (e.g., a concatenation of the dynamic password and a suffix or prefix). Other algorithms for determining textual or data relationships may also be used without detracting from the merits of the present invention.

In steps 407 to 408, if the reply includes texts corresponding to the dynamic password, the authentication module 116 so informs the online transaction module 114, which then allows access to the online financial account.

As can be appreciated, the present invention provides advantages heretofore unrealized. By utilizing two separate communication media, one for general account access and another for authentication, embodiments of the present invention prevent phishing and man-in-the-middle attacks. By using dynamic passwords, phishing attacks that rely on fraudulent schemes to obtain passwords are rendered ineffective. Man-in-the-middle attacks that intercept Internet traffic are also rendered ineffective because two-way authentication (i.e., sending of dynamic passwords and receiving of replies) are performed using a telephone rather than the client computer employed by the user for general access of the account.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of performing a secure online transaction, the method comprising:
   receiving a request to access an online financial account in a session over the Internet, the request being from a client computer employed by a user;
   generating a dynamic password in response to receiving the request, the dynamic password being generated after receiving the request;
   transmitting a first text message to a wireless mobile phone associated with the online financial account, the first text message including the dynamic password;
   receiving a second text message from the mobile phone; and
   allowing the user to access the online financial account using the client computer when the second text message includes a portion that corresponds with the dynamic password.

2. The method of claim 1 wherein the user is allowed to access the online financial account when the portion exactly matches the dynamic password.

3. The method of claim 1 wherein the first and second text messages comprise Short Message Service (SMS) text messages.

4. The method of claim 1 wherein the online financial account allows for transfer of money to other accounts.

5. The method of claim 1 wherein the online financial account comprises a bank account.

6. The method of claim 1 wherein the dynamic password is valid only for the request for one time and is invalid thereafter.

7. A system comprising:
   an online transaction computer configured to provide online transaction services over the Internet, the online transaction computer being configured to service a plurality of online financial accounts, each of the online financial accounts having an associated registered telephone, each of the online financial accounts being configured to be managed over the Internet and to be accessed after a two-way authentication procedure performed over a telephone network, the online transaction computer being configured to generate a dynamic password after and in response to receiving a request from a client computer to access a first online financial account in the plurality of online financial accounts, to send a first dynamic password to a first telephone, and wait for the first dynamic password to be sent back by the first telephone before allowing access to the first online financial account;
   the client computer employed by a user having the first online financial account in the plurality of online financial accounts, the client computer being coupled to the online transaction computer over the Internet, the client computer including a web browser for accessing the first online financial account; and
   the first telephone registered to be associated with the first online financial account, the first telephone being configured to receive a the first dynamic password from the online transaction computer in response to the user requesting to access the first online financial account and configured for use by the user to send a reply to the online transaction computer after receiving the dynamic password in the first telephone.

8. The system of claim 7 wherein the first telephone comprises a mobile phone.

9. The system of claim 7 wherein the first dynamic password is received in the first telephone as part of an SMS text message and wherein the reply comprises another SMS text message.

10. The system of claim 7 wherein the online transaction computer is configured to grant the request to access the first online financial account only when the reply includes a portion that corresponds with the first dynamic password.

11. A method of performing a secure online transaction, the method comprising:
    receiving a request to access an online account using a client computer over a computer network;
    generating a password after receiving the request, the password being generated in response to receiving the request;
    forwarding the password to a telephone registered to be associated with the online account;
    receiving a reply from the telephone; and
    determining if the reply includes a portion that corresponds with the password before allowing access to the online account using the client computer.

12. The method of claim 11 further comprising:
    granting the request only if the portion exactly matches the password.

13. The method of claim 11 wherein the password is forwarded to the telephone as part of a text message and wherein the reply comprises another text message.

14. The method of claim 11 wherein the telephone comprises a mobile phone.

* * * * *